United States Patent [19]
Elliott et al.

[11] Patent Number: 5,987,102
[45] Date of Patent: *Nov. 16, 1999

[54] METHOD AND APPARATUS FOR BRIDGING A VOICE CALL INCLUDING SELECTIVE PROVISION OF INFORMATION IN NON-AUDIO TO THE CALLER

[75] Inventors: John D. Elliott, Portland; Mark D. Zuber; Michael F. Buondonno, both of Beaverton; Kenneth L. Keeler, Hillsboro; Mojtaba Mirashrafi, Portland, all of Oreg.; Keith A. Pirkl, Vancouver, Wash.; Al J. Simon, Hillsboro; George L. Taylor, Tigard, both of Oreg.

[73] Assignee: eFusion, Inc., Beaverton, Oreg.

[ * ] Notice: This patent issued on a continued prosecution application filed under 37 CFR 1.53(d), and is subject to the twenty year patent term provisions of 35 U.S.C. 154(a)(2).

[21] Appl. No.: 08/818,579

[22] Filed: Mar. 14, 1997

[51] Int. Cl.⁶ .................................................. H04M 11/00
[52] U.S. Cl. ...................... 379/93.17; 379/265; 379/212; 379/93.25
[58] Field of Search .................................. 379/67, 88, 89, 379/93.09, 93.17, 93.21, 265, 266, 201, 93.12, 93.07, 93.25, 93.23, 212, 210; 370/356; 395/200.34, 200.48; 348/14, 15, 16

[56] References Cited

U.S. PATENT DOCUMENTS

| 4,771,425 | 9/1988 | Baran et al. . |
| 4,866,704 | 9/1989 | Bergman . |
| 5,164,982 | 11/1992 | Davis ..................................... 379/93.17 |

(List continued on next page.)

FOREIGN PATENT DOCUMENTS

| 0 581 087 A1 | 7/1992 | Germany . |
| 97/26749 | 1/1997 | WIPO . |

OTHER PUBLICATIONS

Patent Cooperation Treaty's International Application Publication Number: WO 96/38018, published Nov. 28, 1996, 26 pgs.
Patent Cooperation Treaty's International Search Report for International application No. PCT/SE 96/00680, dated Sep. 20, 1996, 2 pgs.
"Genesys Telecommunications' net.Vectoring Unites Internet, Advanced Callcenter Capabilities, and Two–Way Real-time Video Conferencing," http://www.genesylslab.com/genesys/press/index.html, Genesys Publications, Dec. 5, 1995.
U.S. Application No. 08/529,166 "Web Page Synchronization System and Method", Sep. 1995.
"Rockwell Blends Personal Response with Internet", Press Release, http://www.ecd.rockwell.com/world/News/press-rel/Archive/internet.html, Jun. 1995.
"Rockwell Switching Systems Division and NetSpeak Team Up for Direct Voice Access to Call Centers From Seb Sites", Press Release http://www.ecdrockwell.com/world/News/pressrel/Archive/netspeak.html, Aug. 1996.
"Advanced Intelligent Internet," http://www.genesylab.com/genesys/press/archived/ainn.html, Genesys Publications, Dec. 13, 1995 and Jan. 10, 1996.

(List continued on next page.)

*Primary Examiner*—Stella Woo
*Attorney, Agent, or Firm*—Blakely Sokoloff Taylor & Zafman, LLP

[57] ABSTRACT

An apparatus is provided with a storage medium having stored therein programming instructions that implement a set of communication services for bridging a voice call from a caller to a calle, and an execution unit coupled to the storage medium for executing the programming instructions. The communication services include call management services for transitioning the voice call through a plurality of call states [including a call holding state] while connecting/disconnecting the caller and the callee, and facilitating selective provision of information in non-audio form to the caller [in at least the call holding state] while transitioning the voice calls through the call states. The caller is also equipped to receive non-audio information.

32 Claims, 7 Drawing Sheets

U.S. PATENT DOCUMENTS

| | | |
|---|---|---|
| 5,327,486 | 7/1994 | Wolff et al. . |
| 5,390,169 | 2/1995 | Bernstein . |
| 5,428,608 | 6/1995 | Freeman et al. ...................... 379/93.09 |
| 5,455,903 | 10/1995 | Jolissaint et al. ........................ 395/155 |
| 5,526,353 | 6/1996 | Henley . |
| 5,539,884 | 7/1996 | Robrock, II . |
| 5,553,063 | 9/1996 | Dickson . |
| 5,583,920 | 12/1996 | Wheeler, Jr. . |
| 5,608,446 | 3/1997 | Carr et al. . |
| 5,619,557 | 4/1997 | Van Berkum .............................. 379/88 |
| 5,721,770 | 2/1998 | Kohler ..................................... 379/266 |
| 5,740,240 | 4/1998 | Jolissaint .................................. 379/265 |
| 5,742,596 | 4/1998 | Baratz et al. ............................ 370/356 |
| 5,828,735 | 10/1998 | Farfan ................................... 379/90.01 |
| 5,832,065 | 11/1998 | Bannister et al. .................... 379/93.17 |
| 5,835,130 | 11/1998 | Read et al. ................................. 348/16 |
| 5,838,682 | 11/1998 | Dekelbaum et al. ................ 379/93.12 |

OTHER PUBLICATIONS

"IDT Releases Net2Phone Commercial Version Three Months Ahead of Schedule," IDT Press Release, http://www.idt.net/8–5–96.html, pp. 1–3, Aug. 5, 1996.

"SoundXchange interACTIVE," SoundXchange, http://www.iact.com, pp. 1–5, Aug. 9, 1996.

"Internet Telephones," PCT Magazine, pp. 107, 108, 110, 114, 117, 118, 119, 120; Oct. 8, 1996.

Hill, Jon, "Net2Phone Makes the Call," PC Magazine, p. 58, Oct. 22, 1996.

"IDT Unveils Full–Duplex Version of Net2Phone," IDT Press Release, http://www.idt.net/11–8–96.html, pp. 1–2, Nov. 8, 1996.

"IDT Unveils Net2Phone Direct at COMDEX," IDT Press Release, http://www.idt/net/11–21–96.html, pp. 1–2, Nov. 21, 1996.

Abstract, "Set: Bellcore Specification of Signaling System Number 7 (SS7)," http://www.bellcore.com, p. 1, 1996.

Abstract, "Bellcore Specification of Signaling System Number 7 (SS7)," http://www.bellcore.com, pp. 1–2, 1996.

"Atlas Telecom Delivers New Enhanced Services Platform Based on Natural MicroSystems Open Telecommunications Technology," http://www.nmss.com/nmsweb/288a_1f6.html, Nov. 5, 1996.

Telephony Services Architecture: "Natural Plaforms," http://www.nmss.com/nmsweb/2486$_1$_1e6.html, 1996.

Natural Platforms: AG–T1 Datasheet "24 Ports of Voice Processing, an Integrated T1 Interface, and Natural Media Options," http://www.nmss.com/nmsweb/22b_1c6.html, 1996.

"Frequently Asked Questions–Technical Support FAQ's," What Is Net2Phone, http://www.net2phone.com.techfaq.html, pp. 2–8.

Net2Phone Info, http://www.net2phone.com/ninfo.html, p. 1, printed Dec. 17, 1996.

"Welcome to the Vicinity Corporation Home Page," http://www.vicinity.com, pp. 2–3, 1996.

"Microlegend SS7 Tutorial: The SS7 Protocol Stack", http://www.microlegend.com/stack.html, pp. 1–2, last update May 23, 1997.

"Microlegend SS7 Tutorial: Signaling Connection Control Part", http://www.microlegend.com/sccp.html, p. 1, last update May 23, 1997.

"Microlegend SS7 Tutorial: Transaction Capabilities Application Part", http:www.microlegend.com/tcap.html, pp. 1–2, last update May 23, 1997.

"Microlegend SS7 Tutorial: What is SS7?", http://www.microlegend.com/whatss7.html, pp. 1–3, last update May 25, 1997.

"Microlegend SS7 Tutorial: Message Transfer Part", http://www.microlegend.com/mtp.html, pp. 1–5, last update Jun. 9, 1997.

"Microlegend SS7 Tutorial: ISDN User Part", http://www-.microlegend.com/isup.html, pp. 1–3, last update Jun. 10, 1997.

Telephony Gateway White Paper, "VocalTec Telephony Gateway," http://www.vocaltec.com, pp. 2–9; ©1993–1996.

METHOD AND APPARATUS FOR BRIDGING A VOICE CALL INCLUDING SELECTIVE PROVISION OF INFORMATION IN NON-AUDIO TO THE CALLER

BACKGROUND OF THE INVENTION

1. Field of the Invention

The present invention relates to the field of telecommunications and, in particular, to a method and apparatus for processing calls.

2. Background Information

Applying computer technology to telecommunicaitons is generally known in the art. For example, private branch exchanges (PBX) are routinely augmented with automated receptionist/attendant and/or voice messaging systems. The applications range from simple automated receptionist services, to voice messaging services, to obtaining account information, such as balances, to conducting transactions of simple to moderate complexity, such as fund transfers. In each of these applications, the caller is automatically attended to through a series of voice menus.

Recently advances in computer technology have enabled users of computer systems to obtain information and communicate with each other over the Internet. Computer users can "surf the net" to browse at web pages offered by various web servers on the Internet. Computer users can also communicate with each other through e-mails as well as voice calls. Various vendors even offer services to facilitate voice calls between users of computer systems and users of conventional telephone handsets. However, these services are still in their infancy states with various limitations including for example, the requirement of a voice call originating computer user to know and enter the telephone number of the destination handset. Furthermore, call centers are continuing to handle voice calls as if all voice calls are originated from conventional handsets, without leveraging on the fact that increasing number of voice calls are originated through the Internet. It is therefore desirable to further enhance the current state of art for Internet telephony, in particular, the manner in which voice calls are processed by vendors who facilitate Internet telephony, and the manner in which call centers handle voice calls.

SUMMARY OF THE INVENTION

A method and apparatus for providing customized voice call processing is described herein. In one embodiment, the apparatus comprising a storage medium having stored therein programming instructions that implement a set of communication services for bridging a voice call from a caller to a calle, and an execution unit coupled to the storage medium for executing the programming instructions. The communication services include call management services for transitioning the voice call through a plurality of call states [including a call holding state] while connecting/disconnecting the caller and the callee, and facilitating selective provision of information in non-audio form to the caller [in at least the call holding state] while transitioning the voice call through the call states. The caller is also equipped to receive non-audio information.

In one embodiment, the selective provision of information in non-audio is facilitated in accordance with received processing directions. In one embodiment, the processing directions are provided by an automated attendant service in response to call events associated with the transitioning and facilitating selective provision of non-audio information of the voice call. In one embodiment, the call management services notify the automated attendance service of the call events.

In one embodiment, the call events include an information page pushed event, an information page browsed event, a playing audio file event, an audio file played event, a call arrival event, a call held event, a call still holding event, a placing call event, a call ringing event, a call still ringing event, a call active event, a call still active event, a line busy event, a dropping call event, a closing down call event, a call ended event, and/or a call error event. In other embodiments, more or less call events may be supported.

In one embodiment, the customized call processing directions include a direction to push an information page to the client computer, a direction to play an audio file for the client computer, a direction to place call on hold call, a direction to proceed with a call, a direction to call a new destination instead, and a direction to drop a call. In other embodiments, more or less call processing directions may be supported.

In one embodiment, the call states further include a call registered state, a call setup state, a placing call state, a call busy state, a call ringing state, a call active state, a call dropping state, a call closing state, and/or a call error state. In other embodiments, more or less call states may be supported.

In one embodiment, the transitioning include transitioning a voice call into a call holding state in response to a direction to hold the voice call, transitioning a voice call into a placing call state in response to a direction to proceed with the voice call or to a call a new destination instead, transitioning a voice call into a dropping call state in response to a direction to drop the voice call. In one embodiment, the transitioning further includes transitioning a voice call into a call holding state if a resource shortage condition is encountered, and transitioning of a voice call into a call ringing state if a resource becoming available condition is encountered. In other embodiments, more or less inter-call state transitions may be supported.

In one embodiment, the apparatus includes the automated attendant service. In one embodiment, the automated attendant service employs case based reasoning in providing the call processing directions. In one embodiment, the voice call being originated by the caller in packet form, and the communication services further include services for receiving the packet based call placing a PSTN call to the PSTN extension of the callee, and bridging the packet based and PSTN calls. In one embodiment, the apparatus is coupled to a private branch exchange (PBX) to augment the PBX to provide call center services.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, certain method steps are delineated as separate steps, however, these separately delineated steps should not be construed as necessarily order dependent in their performance.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
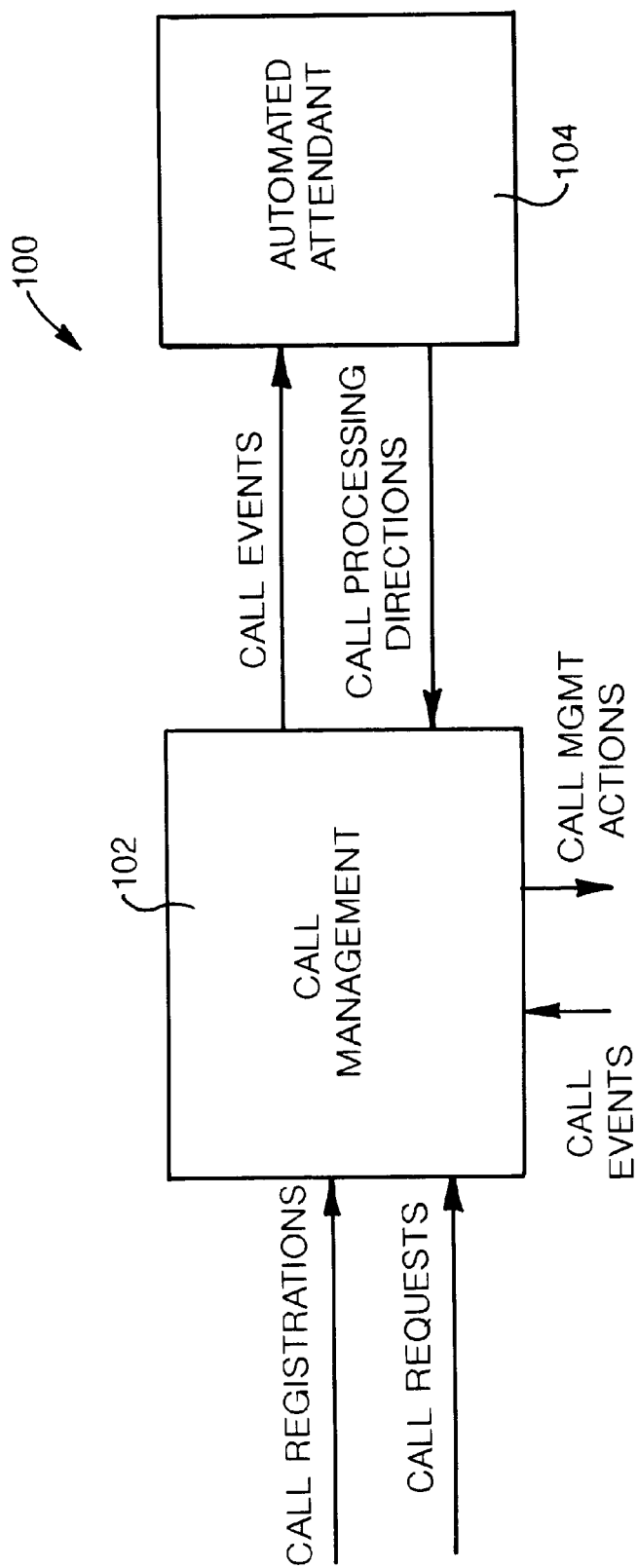
FIG. 1 is a block diagram illustrating one embodiment of the present invention in operation.

Referring now to FIG. 1, wherein a block diagram illustrating one embodiment of the present invention in operation is shown. As illustrated, the present invention includes call management service 102. For the illustrated embodiment, the present invention further includes automated attendant service 104. Call management service 102 notifies automated attendant service 104 of call events. In response, automated attendant service 104 provides call processing directions to call management service 102. In one embodiment, automated attendant service 104 provides call processing directions, employing case based reasoning. Thus, by customizing the call processing directions provided to call management service 102, in response to call events, customized call processing may be beneficially achieved.

Figure 2:
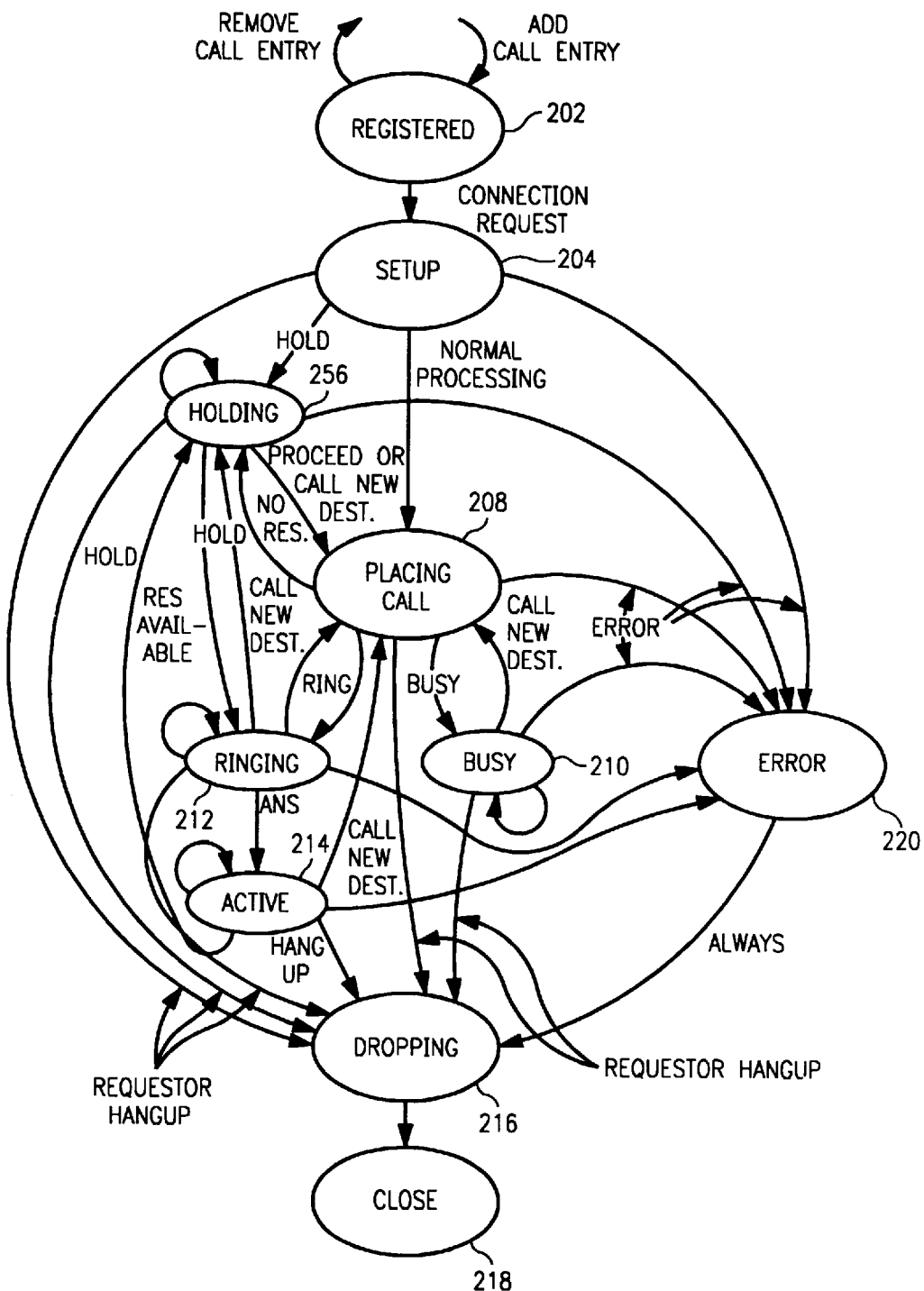
FIG. 2 is a state diagram illustrating the various call states of a call being processed in accordance with one embodiment of the present invention.
Figure 3:
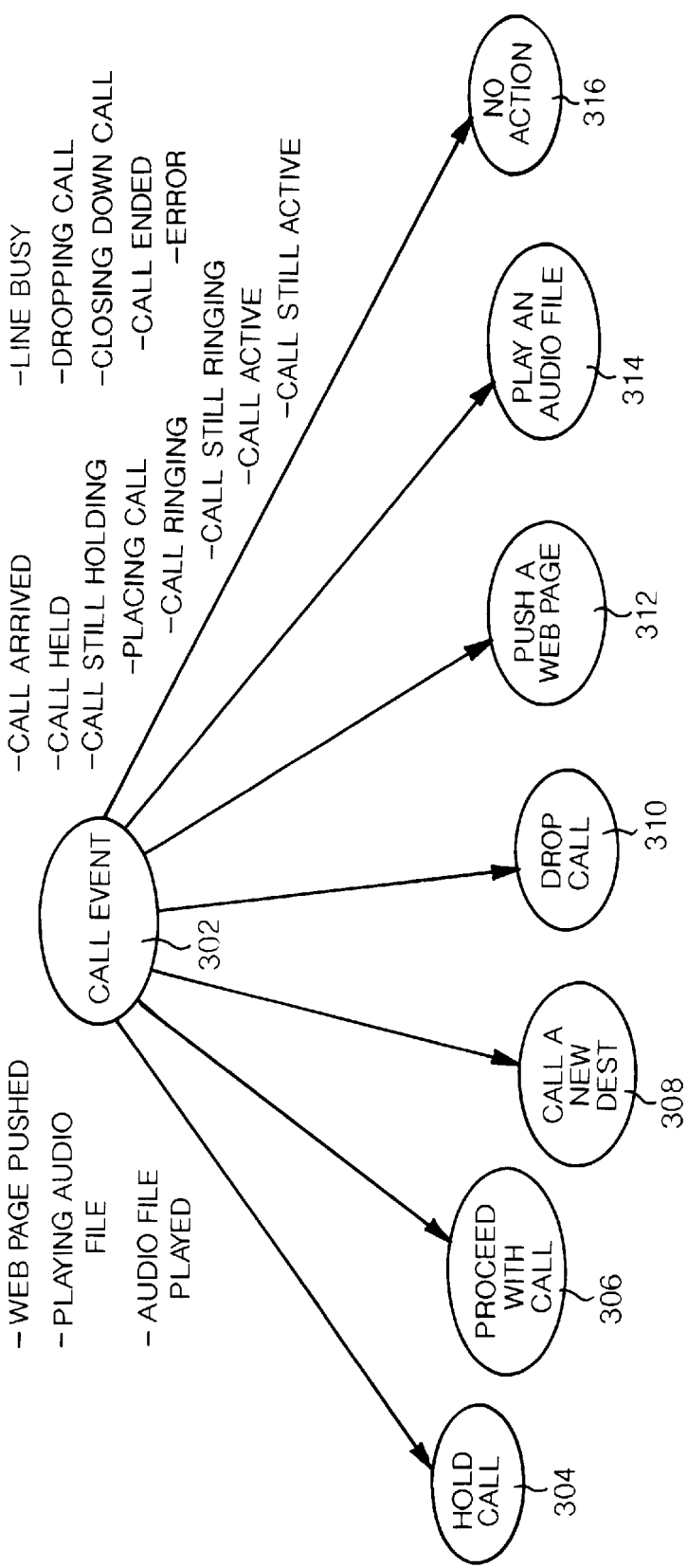
FIG. 3 is a block diagram illustrating the various directions provided by the automated attendant service in accordance with one embodiment of the present invention.

Referring now to FIGS. 2 and 3, wherein FIG. 2 illustrates the various call states of a call processed by call management service 102, and FIG. 3 illustrates the various call events and call processing directions, in accordance with one embodiment of the present invention. For the illustrated embodiment, the call states include call registered state 202, call setup state 204, call holding state 206, placing call state 208, call busy state 210, call ringing state 212, call active state 214, call dropping state 216, call closing state 218, and call error state 220. The call events include an information page pushed event, an information page browsed event, a playing audio file event, an audio file played event, a call arrival event, a call held event, a call still holding event, a placing call event, a call ringing event, a call still ringing event, a call active event, a call still active event, a line busy event, a dropping call event, a closing down call event, a call ended event, and a call error event. The call processing directions include direction 312 to push an information page to the caller, (which is a computer caller, or a client computer associated with a handset caller, hereinafter simply caller), direction 314 to play an audio file for the caller, direction 304 to place a call on hold, direction 306 to proceed with a call, direction 308 to call a new destination instead, and direction 310 to drop a call. For the illustrated embodiment, automated attendant service 104 may also take no action 316 in response to the notification of a call event.

A call enters call registered state 202 when the call is registered with call management service 102. The call remains in call registered state 202 until the call is either deregistered or actually received. When received, the call transitions into call setup state 204. While in call setup state 204, various setup actions, e.g. initializing data structures and so forth are performed. The specific setup actions taken are implementation dependent. However, in accordance with the present invention, while in setup state 204, a call arrived event will be posted to automated attendant service 104. In response, automated attendant service 104 may take no action, direct the call to proceed, place the call on hold, push an information page to the caller, play an audio file for the caller, redirect the call to a new destination, or direct the call to be dropped. The specific direction given is implementation dependent. In one embodiment, the present invention includes multiple instantiations of automated attendant service 104, where different call processing directions are given for different call type. In other words, under the present invention, not only call processing may be customized for different implementations, but call processing may also be customized by call characteristics. Depending on the direction or absence of direction, call management service 102 transitions the call to a new call state accordingly, i.e. call holding state 206, placing call state 208 etc. In one embodiment, if automated attendant service 104 elects to take no action, i.e. provides no direction, after a predetermined period of time, call management service 102 transitions to placing call state 208.

For the illustrated embodiment, while in holding state 206, call management service 102 would post a call held event, then a call still waiting event periodically thereafter to automated attendant service 104. In one embodiment, the period is predetermined, and the expiration of the predetermined period is tracked using a software timer. In response to each of these call held/call still holding events, automated attendant service 104 may take no action, direct the call to proceed, direct continue holding of the call, push another information page to the caller, play another audio file for the caller, redirect the call to a new destination, or direct the call to be dropped. Again, the specific direction given is implementation dependent. Depending on the direction or absence of direction, as well as certain resource availability events, call management service 102 transitions the call to a new call state accordingly, i.e. placing call state 208, call ringing state 210, etc. In one embodiment, if automated attendant service 104 elects to take no action, i.e. provides no direction, call management service 102 continues to keep the call in call holding state 206, until either the automated attendant service 104 provides direction, or the caller hangs up, in which case, call management service 102 transitions the call to call dropping state 216. In one embodiment, however if the call entered call holding state 206 because of a resource shortage condition of the host system, e.g. all communication ports are in used, call management service 102 transitions the call into call ringing state 212, when the pending resource becomes available.

While in call placing state 206, call management service 102 performs various call placing actions, e.g. instructing a connection service to dial the destination PSTN extension. The precise actions taken are implementation dependent. However, in accordance with the present invention, a placing call event would be posted to automated attendant service 104. In response, automated attendant service 104 may take no action, direct the call to be placed on hold again, push another information page to the caller, play another audio file for the caller, redirect the call to a new destination, or direct the call to be dropped. Again, the specific direction given is implementation dependent. Depending on the direction or absence of direction, as well as depending on whether a call ringing or call busy signal is encountered, call management service 102 transitions the call to a new call state accordingly, i.e. call holding state 206, call ringing state 210, call busy state 212 etc. In one embodiment, if a resource shortage condition is encountered for the host system, e.g. all communication ports are in used, call management service 102 transitions the call to call holding state 206.

While in call busy state 206, in accordance with the present invention, a line busy event would be posted to automated attendant service 104. In response, automated attendant service 104 may take no action, push another information page to the caller, play another audio file for the caller, redirect the call to a new destination, or direct the call to be dropped. The specific direction given is implementation dependent. Depending on the direction or absence of direction, call management service 102 transitions the call to a new call state accordingly, i.e. placing call state 208, call dropping state 216 etc. In one embodiment, if automated attendant service 104 elects to take no action, i.e. provides no direction, call management service 102 continues to keep the call in call busy state 206, until either the automated attendant service 104 provides direction, or the caller hangs up, in which case, call management service 102 transitions the call to call dropping state 216.

While in call ringing state 212, in accordance with the present invention, a call ringing event would be posted to automated attendant service 104. In response, automated attendant service 104 may take no action, push another information page to the caller, play another audio file for the caller, redirect the call to a new destination, or direct the call to be dropped. The specific direction given is implementation dependent. Depending on the direction or absence of direction, as well as whether the ring is answered, call management service 102 transitions the call to a new call state accordingly, i.e. call holding state 206, placing call state 208, call active state 214 etc. In one embodiment, if automated attendant service 104 elects to take no action, i.e. provides no direction, call management service 102 continues to let the call ring, until either the ring is answered or the caller hangs up. In the former case, call management service 102 transitions the call to call active state 214, whereas in the latter case, call management service 102 transitions the call to call dropping state 216.

While in call active state 214, call management service 102 facilitates the call. Additionally, in accordance with the present invention, a call active event, and then a call still active event periodically thereafter is posted to automated attendant service 104. In one embodiment, the period is also predetermined, and the expiration of the predetermined period is tracked by a software timer. In response, automated attendant service 104 may take no action, push another information page to the caller, play another audio file for the caller, redirect the call to a new destination, or direct the call to be dropped. The specific direction given is implementation dependent. Depending on the direction or absence of direction, as well as whether a party hangs up, call management service 102 transitions the call to a new call state accordingly, i.e. call holding state 206, placing call state 208, call active state 214 etc. In one embodiment, if automated attendant service 104 elects to take no action, i.e. provides no direction, call management service 102 continues to facilitate the call, until one of the parties hangs up, in which case, call management service 102 transitions the call to call dropping state 216.

While in call dropping state 216, call management service 102 tears down the call connection. Additionally, in accordance with the present invention, a call dropping event is posted to automated attendant service 104. In response, automated attendant service 104 may take no action, push another information page to the caller, play another audio file for the caller. The specific direction given is implementation dependent. Upon tearing down the call connection etc., call management service 102 transitions the call to call closing state 218.

While in call closing state 218, call management service 102 tears down the call setups. Additionally, in accordance with the present invention, a call closing event is posted to automated attendant service 104. For the illustrated embodiment, no further direction is expected from automated attendant service 104; if provided, the direction is ignored. For the illustrated embodiment, call management service 102 also deregisters the call.

For the illustrated embodiment, as described earlier, the call states also include call error state 220. Call management service 102 transitions a call into call error state 220 from call setup state 204, call holding state 206, placing call state 208, call busy state 210, call ringing state 212, and call active state 214, whenever an error is encountered. From the call error state 220, call management service 102 transitions a call into call dropping state 216.

For the illustrated embodiment, in response to direction 312 to push an information page to a caller, call management service 102 causes the information page to be pushed to the caller. In one embodiment, call management service 102 causes the information page to be pushed by way of a web server. Upon causing the information page to be pushed, call management service 102 posts an information page pushed event to automated attendant service 104. Similarly, in response to direction 314 to play an auido file to a caller, call management service 102 causes the audio file to be played for the caller. In one embodiment, call management service 102 causes the audio file to be played by way of audio and streaming services. Upon causing the audio file to be played, call management service 102 posts an audio file played event to automated attendant service 104.

To summarize, by customizing the call processing directions provided by different instantiation of automated attendant service 104, customized call processing may be provided by apparatus equipped with call management service 102 of the present invention. In particular, by customizing information page pushing and audio file playing directions, a handset caller having an associated computer, as well as a computer caller may be provided with enhanced experience, when their calls are processed.

Figure 4A:
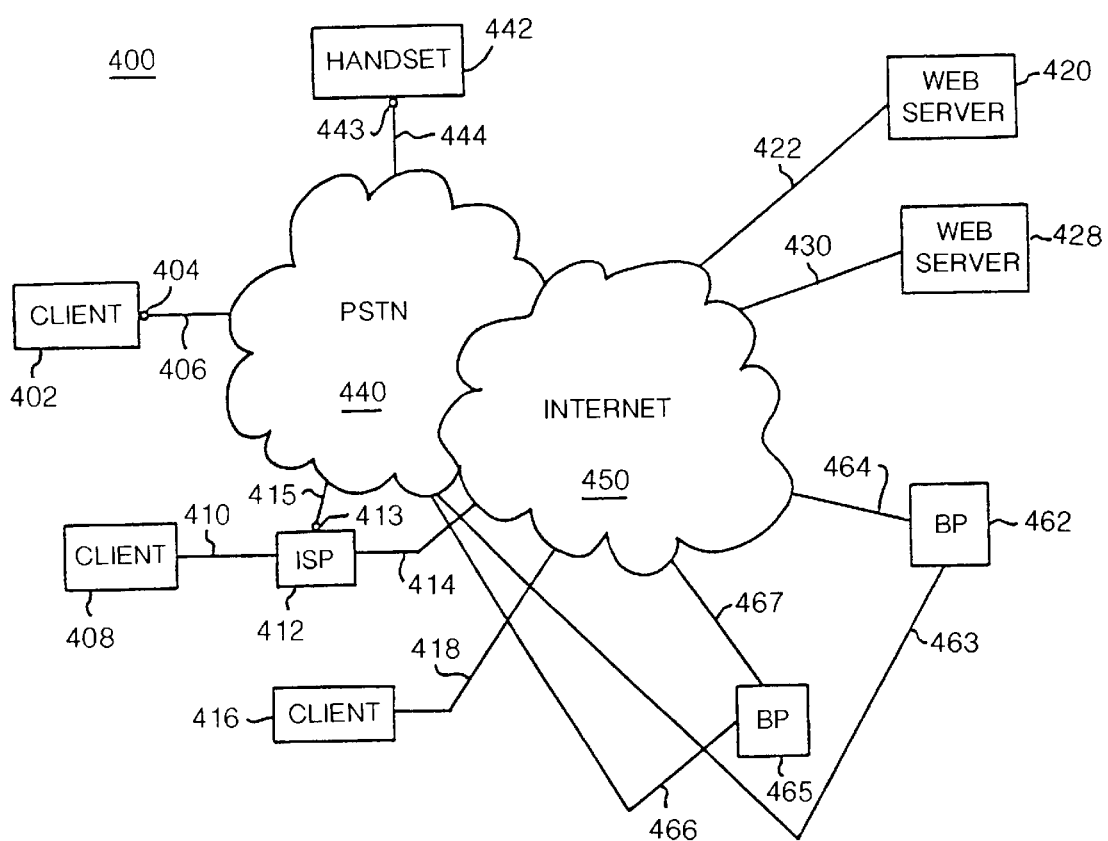
FIGS. 4a–4b illustrate an exemplary communication application suitable for practicing the present invention.
Figure 4B:
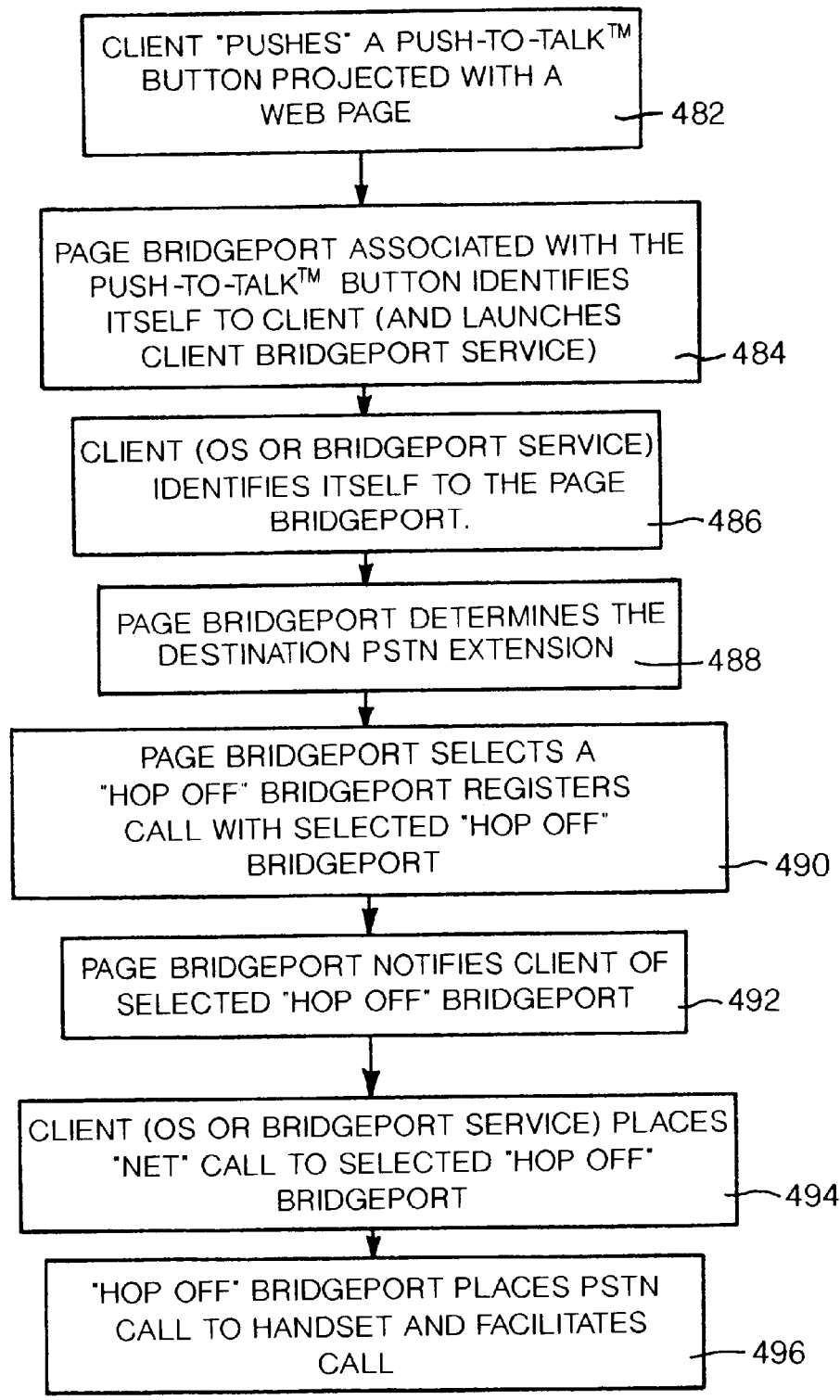

Referring now to FIGS. 4a–4b, two block diagrams are presented illustrating an exemplary application of the present invention. FIG. 4a illustrates an exemplary communication system 400 including client computer 402, PSTN extension 443 assigned to handset 442, web servers 420 and 428, and a community of bridgeports 462 and 465, communicatively coupled to each other through PSTN 440 and internet 450. FIG. 4b illustrates one embodiment of the method steps employed for bridgeports 462 and 465 to facilitate placement of a voice call to PSTN extension 443 associated with web server 428 for client computer 402, and having the call automatically routed off internet 450 at an optimal "hop off" bridgeport, e.g. bridgeport 465, without requiring client computer 402 to provide or even knowing PSTN extension 443. An example of association between PSTN extension 443 and web server 428 is the association between a "local" representative and the corporate entity providing the web server. Bridgeport 465 is equipped with call management service 102 and automated attendant service 103 of FIGS. 1–3 as described earlier, to provide enhanced call processing experience to client computer 402 in accordance with the present invention, as bridgeport 465 facilitates the voice call.

Turning first to FIG. 4a, for the illustrated embodiment, client computer 402 while in data communication with a web server, e.g. web server 428, through PSTN 440 and Internet 450, is presented with a "push-to-talk" option by web server 428. When client computer 402 selects the "push-to-talk" option, bridgeport 462 automatically determines an appropriate destination PSTN extension, e.g. the PSTN extension of telephone handset 442, as well as an appropriate one of the community of bridgeports 462 and 465 to place the voice call to the PSTN extension and facilitate the voice call between the user of client computer 402 and the user of telephone handset 442. The "push-to-talk" option is pre-associated with bridgeport 462 by web server 428, and the determination of the destination PSTN extension by bridgeport 462 is made in accordance with one or more attributes of web server 428, such as the identity of web server 428, and optionally, one or more attributes of client computer 402, such as the zip code of the area client computer 402 is located.

Client computer 402, web servers 420 and 428, bridgeports 462 and 465, and handset 442 are communicatively coupled to each other by way of PSTN 440 and internet 450 as shown. For the illustrated embodiment, client computer 402 is coupled to internet 450 by way of an internet service provider (ISP) 412. Client computer 402 is coupled to ISP 412 through PSTN extension 404, communication line 406 and PSTN 440. In other words, for the illustrated embodiment, client computer 402 includes a modulation/demodulation (MODEM) device (not shown) coupled to PSTN extension 404. Web servers 420 and 428 are coupled to internet 450 through connections 422 and 430. Although not illustrated, web servers 420 and 428 may also be coupled to PSTN 440. Similarly, bridgeports 462 and 465 of the present invention are coupled to internet 450 through connections 464 and 467. Bridgeports 462 and 465 are also coupled to PSTN 440 through communication lines 463 and 466 respectively. Handset 442 is coupled to PSTN 440 through PSTN extension 443 and communication line 444.

Communication lines 406, 415 and 444 may simply be plain old telephone service (POTS) communication lines, although other types of communication lines may be used. For example, in the case of communication line 406, it may be an integrated service digital network (ISDN) line, whereas in the case of communication line 415, it may be a T1 (1.533 Mbps) or an E1 (2.0488 Mbps) trunk line. In the case of communication line 444, it may be a wireless cellular connection.

PSTN 440 includes a number of Service Switching Points (SSP), Signal Transfer Points (STP), and Service Control Points (SCP) coupled to each other (not shown). PSTN extension 404 through communication line 406 is coupled to a "local" SSP, which in turn is coupled to a number of other "local" PSTN extensions, including e.g. PSTN extension 413 if ISP 412 is a "local" ISP served by the same SSP. In addition, the "local" SSP is also coupled to an associated STP, which in turn is coupled to other "remote" SSPs. Each of the "remote" SSPs is coupled to a number of "remote" PSTN extensions, including e.g. extension 443, if handset 442 is a "remote" handset served by a "remote" SSP. As is well known in the art, internet 450 includes a number of networks interconnected by routers, interconnecting the various client computers, web servers and bridgeports together. [Note that internet 450 may be a private intranet instead.]

Client computer 402 is intended to represent a broad category of internet telephony enabled computer systems known in the art. An example of such a computer system is a desktop computer system equipped with a high performance microprocessor, such as the Pentium® processor manufactured by Intel Corporation of Santa Clara, Calif. or the Alpha® processor manufactured by Digital Equipment Corporation of Manard, Mass.; a number of audio input and output peripherals/interface for inputting, digitizing and compressing outbound audio, and for decompressing and rendering inbound audio; a communication interface for sending and receiving various data packets (including audio data packets) in accordance with certain standard communication protocol, such as a V.42bis compliant modem or an Ethernet adapter card; a windows-based operating system including internetworking communication services providing support for Transmission Control Protocol/Internet Protocol (TCP/IP) (and other Internet Communication Suite protocols) and socket services, such as Windows™ 95 developed by Microsoft Corporation of Redmond, Wash.; a web communications tool such as Navigator™, developed by Netscape Communications of Mountain View, Calif.; and an internet telephony application, such as the above described IPhone™[1] developed by Intel Corporation. In one embodiment, client computer 402 also includes a client bridgeport driver that cooperates with bridgeports 462 and 465 to allow the voice call to be established and facilitated. In other embodiments, the functions performed by client bridgeport driver are incorporated in a browser and/or the operating system of client computer 402.

[1] Note that it is not necessary for the internet telephony application to explicitly support voice calls with telephone handsets, as is the case with IPhone and many of the prior art internet telephony applications.

Except for the presentation of web pages having "push-to-talk" options pre-associated with the bridgeports of the present invention, web servers 420 and 428 are intended to represent a broad category of web servers, including e.g. corporate presence servers and government presence servers, known in the art. Any number of high performance computer servers may be employed as web servers 420 and 428, e.g. a computer server equipped with one or more Pentium® Pro processors from Intel Corp., running Mircrosoft's Windows® NT operating system, or a computer server equipped with one or more SPARC® processors from Sun Microsystems of Mountain View, Calif., running Sun's Solaris® operating system.

Similarly, ISP 412 is intended to represent a broad category of internet service providers. An ISP may be a "small" local internet access provider, or one of a number of point of presence providers offered by a "large" ISP. It is also anticipated that ISP 412 may be incorporated with an SSP of PSTN 440. Handset 442 is intended to represent a broad category of conventional handsets known in the art, including but not limited to desktop handsets, cordless handsets, and wireless handsets. No special features are required of handset 442 for it to be called and connected to internet telephony enabled client computer 402. [Note that handset 442 may be any one of a number of automated/computerized telephony answering equipment instead.] For a more detailed description of exemplary communication system 400, see copending U.S. patent application Ser. No. 08/818,770, filed contemporaneously, having common assignee of the present invention, and titled "Method and Apparatus For Establishing and Facilitating A Voice Call to A PSTN Extension For A Networked Client Computer", which is hereby fully incorporated by reference.

With reference to FIG. 4b, the method begins at step 482 with a user of client computer 402 "pushing" the "push-to-talk" button projected with the webpage. As described earlier, the "push-to-talk" button is pre-associated with a bridgeport, e.g. bridgeport 462, (also referred to as the page bridgeport). In one embodiment, the pre-association is accomplished via HyperText Markup Language (HTML) elements embedded in the web page, identifying the Uniform Resource Locator (URL) of bridgeport 462. The HTML elements further specify that a "push-to-talk" event notice including the URL of web server 428 is to be posted to bridgeport 462. Thus, in response to the user's "pushing" of the "push-to-talk" button, a HyperText Transmission Protocol (HTTP) connection is temporarily established between client computer 402 and bridgeport 462, and a message posting the "push-to-talk" event is sent to bridgeport 462. [Those skilled in the art will appreciate that the terms "push" and "pushing" are metaphoric description of the action taken by a user. The action is in actuality accomplished, e.g., by the user clicking a mouse button, upon moving a cursor over the displayed "push-to-talk" button.]

For the illustrated embodiment, in response to the "push-to-talk" event notification, page bridgeport 462 identifies itself to client computer 402, providing client computer 402 with its IP address, step 484. The HTTP connection is closed upon sending the return data to client computer 402 by page bridgeport 462. In one embodiment, the identification and provision of page bridgeport's IP address also includes identification that the information is associated with a "push-to-talk" button projected by web server 428. More specifically, the URL of web server 428 is also returned to client computer 402. For the illustrated embodiment, the returned data also includes a command for starting up the client bridgeport driver on client computer 402.

Next, for the illustrated embodiment, client computer 402 identifies itself to page bridgeport 462, providing page bridgeport 462 with its IP address and attributes. For the illustrated embodiment, the identification is performed by the launched client bridgeport driver, by way of another HTTP connection. In one embodiment, the identification is also made in the form of a call request to talk to a person, such as an agent, associated with web server 428. In one embodiment, the attribute information includes a zip code for the area client computer 402 is located. In another embodiment, the attribute information includes a PSTN extension associated with client computer 402. In one embodiment, the URL of web server 428 is also re-transmitted.

In response, page bridgeport 462 determines a destination PSTN extension for the requested call, step 488. In one embodiment, the determination is based on attributes of web server 462, e.g. the URL or the associated corporate name (if provided) of web server 462. In another embodiment, the determination is also based on attributes of client computer 402, e.g. the zip code or the telephone area code/prefix associated with client computer 402. In one embodiment, page bridgeport 462 is equipped with a PSTN extension database having the necessary attributes and PSTN extension information for performing the determination. In an alternate embodiment, page bridgeport 462 is not equipped with such a PSTN extension database, but equipped with services that access external on-line directory services to make the determination. An example of on-line directory services is MapBlast™ developed by Vicinity Corporation of Palo Alto, Calif.

Upon determining the destination PSTN extension, for the illustrated embodiment, page bridgeport 462 selects a bridgeport, e.g. bridgeport 465, (also referred to as the "hop off" bridgeport, where the requested voice call would be routed off internet 450 and onto PSTN 440, step 490. The selection is made from a "community" of bridgeports. In one embodiment, the "community" of bridgeports are "private" bridgeports deployed by the corporation of web server 428. In another embodiment, the "community" of bridgeports are "public" bridgeports deployed by a service company that offers "bridgeport" service of the present invention, and subscribed by the corporation of web server 428. Note that page bridgeport 462 may select itself as the "hop off" bridgeport, either because of the selection criteria employed dictate the result, or by virtue of a singleton community, i.e. page bridgeport 462 is the only bridgeport of the "community". For ease of understanding, the remaining descriptions will be presented in the context of the bridgeport 465 being the selected "hop off" bridgeport. For a more detailed description of the selection process, see the above identified incoporated by reference copending U.S. patent application Ser. No. 08/818,770.

Upon selecting "hop off" bridgeport 465, for the illustrated embodiment, page bridgeport 462 registers the requested call with "hop off" bridgeport 465, step 490. "Hop off bridgeport 465, equipped with call management service 102 and automated attendant service 104 of the present invention, as described earlier, places the registered call in registered call state 202. In one embodiment, the registration also reserves bandwidth on "hop off" bridgeport 465 for the requested call. In one embodiment, the registration includes provision of the source IP address of the voice call, i.e. the IP address of client computer 402, the source type (e.g. H.323), the destination address, i.e. the destination PSTN extension of handset 442, and the destination type (e.g. POTS).

Next, for the illustrated embodiment, page bridgeport 462 identifies "hop off" bridgeport 465 to client computer 402, providing client computer 402 with the IP address of "hop off" bridgeport 465, step 512. In one embodiment, where the call request is made through a HTTP connection, step 512 also includes closing the HTTP connection. In one embodiment, the identification also includes provision of the URL of web server 428. In one embodiment, both the identification, i.e. the IP address of "hop off" bridgeport 465, and the URL of web server 428 are provided to client bridgeport application.

Next, for the illustrated embodiment, client computer 402 places a net call to "hop off" bridgeport 465, step 494. In one embodiment, the net call is a H.323 call placed by an internet telephony application. In one embodiment, step 514 also includes automatic launching of the internet telephony application to place the net call, if an internet telephony application has not been previously launched. For the illustrated embodiment, the automatic launching is performed by the client bridgeport driver.

In response, "hop off" bridgeport 465 processes the call and places a voice call to the PSTN extension of handset 442, and bridging the net and the voice calls, step 496, thereby allowing a user of client computer 402 to converse with a user of handset 442. As described earlier, call management service 102 transitions the call to call set up state 204 and sets up the call. While in call set up state 204, "call management service 102 post a call arrived event to automated attendant service 104. In response, automated attendant service 104 may take no action or one of the above described actions, e.g. direct a webpage to be pushed to client computer 402, direct an audio file to be played for client computer 402, direct the call to be placed on hold etc. Depending on the customized call processing directions provided by automated attendant service 104 or lack thereof, call management service 102 transitions the call through the above described states, which eventually leads to call active state 214, when the PSTN call to PSTN extension 443 is actually placed, ring and answered.

In bridging the two calls, while in call active state 214, "hop off" bridgeport 465 digitizes and compresses inbound call signals received from handset 442, and delivers the encoded call signals to client computer 402 via the previously established H.323 connection. The compressed inbound call signals are decompressed by the communication interface of client computer 402 and rendered by the internet telephony application. Similarly, outbound call signals emanating from client computer 402 are digitized by the audio interface, compressed by the communication interface of client computer 402 and delivered to "hop off" bridgeport 465 via the H.323 connection, wherein they are decompressed, and upon conversion, forwarded to handset 442. In other words, "hop off" bridgeport 465 converts the voice information between PSTN and IP protocols and delivers voice call information to/from handset 442 and client computer 402 until call completion.

Eventually, when one of the party hangs up, call management service 102 of "hop off" bridgeport 465 transitions the call to call dropping state 216, where the connection is "dropped" or "tear down", and then to call closing state 218, where the call is deregistered and terminated.

Thus, by configuring automated attendant service 104 to provide customized call processing directions to call management service 102, additional information pages can be provided to client computer 402, as well as having audio rendered for client computer 402, while the call is being "active" as well as while the call is being "established". The capabilities may be employed simply to enhance the "waiting" experience, or present advertisements to client computer 402, pre-screen the call or assist an agent answering the call. Those skilled in the art will recognize that a wide variety of applications can be benefited by practicing the customized call processing of the present invention.

Note that steps 484–486 are all performed automatically in response to step 502, without requiring any intervention from the user of client computer 402. In particular, it does not require the user of client computer 402 to enter the PSTN extension of handset 442, nor the IP address of "hop off" bridgeport 465. It does not even require the user of client computer 402 to know these information. All it is required of the user is metaphorically "pushing" the "push-to-talk" button projected by web server 428.

It should also be noted that while bridgeport 462 is being described as page bridgeport and bridgeport 465 is being described as "hop off" bridgeport, being members of a community of bridgeports, a member bridgeport not only may be a page bridgeport at one point in time, and a "hop off" bridgeport at another time, a member bridgeport actually can be a page bridgeport and a "hop-off" bridgeport at the same time for either the same or different clients. As will be readily apparent from the descriptions to follow, bridgeports 462 and 465 of the present invention can be practiced with computer servers programmed to perform the above described bridgeport functions, thus it is expected that a bridgeport may be integrated with other equipment in a variety of manners, for examples, with a web server, an ISP, a STP, and so forth.

Figure 5:
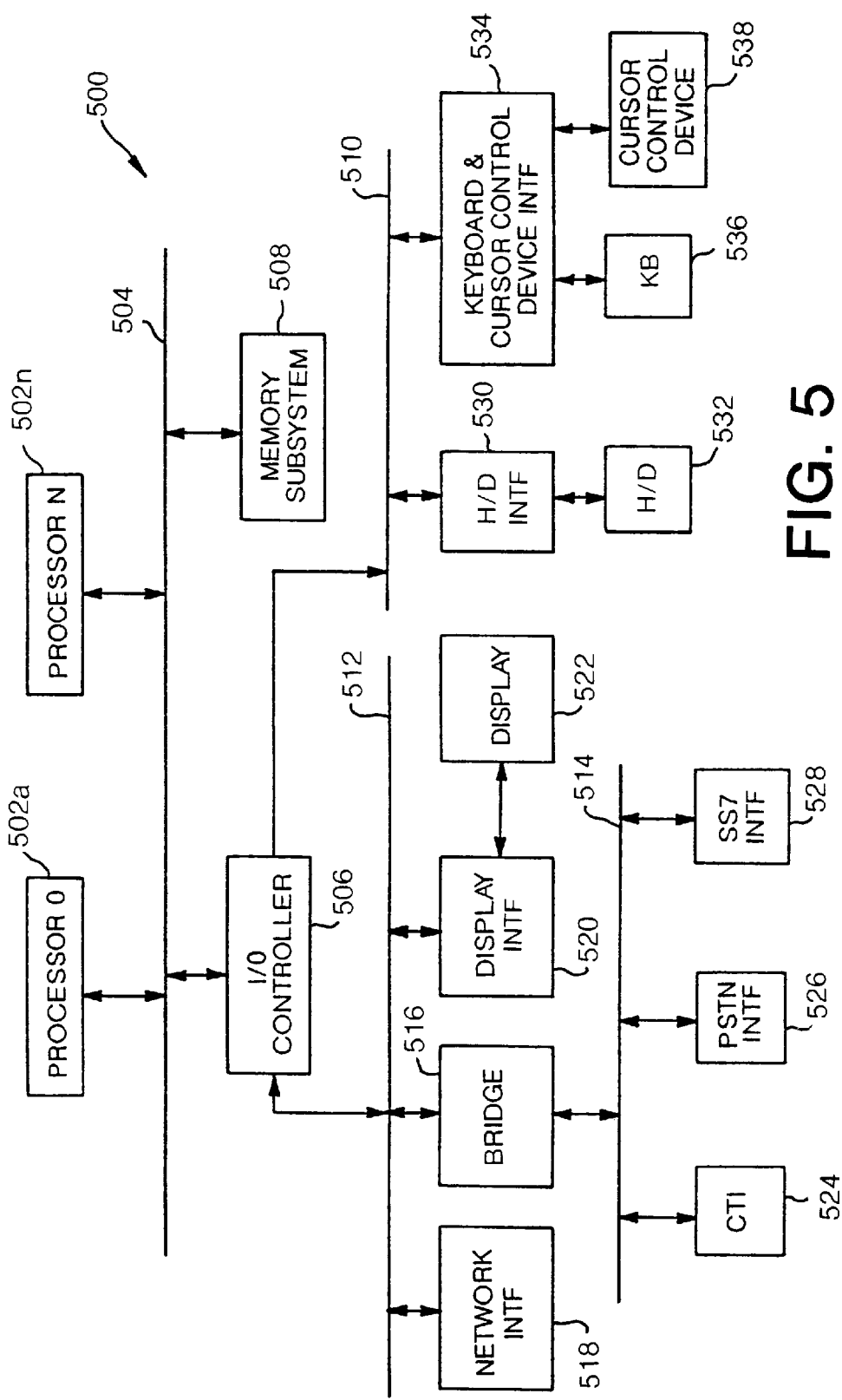
FIGS. 5 and 6 illustrate a hardware and a software view of the components of a computer system suitable for use as a bridgeport of the exemplary communication.
Figure 6:
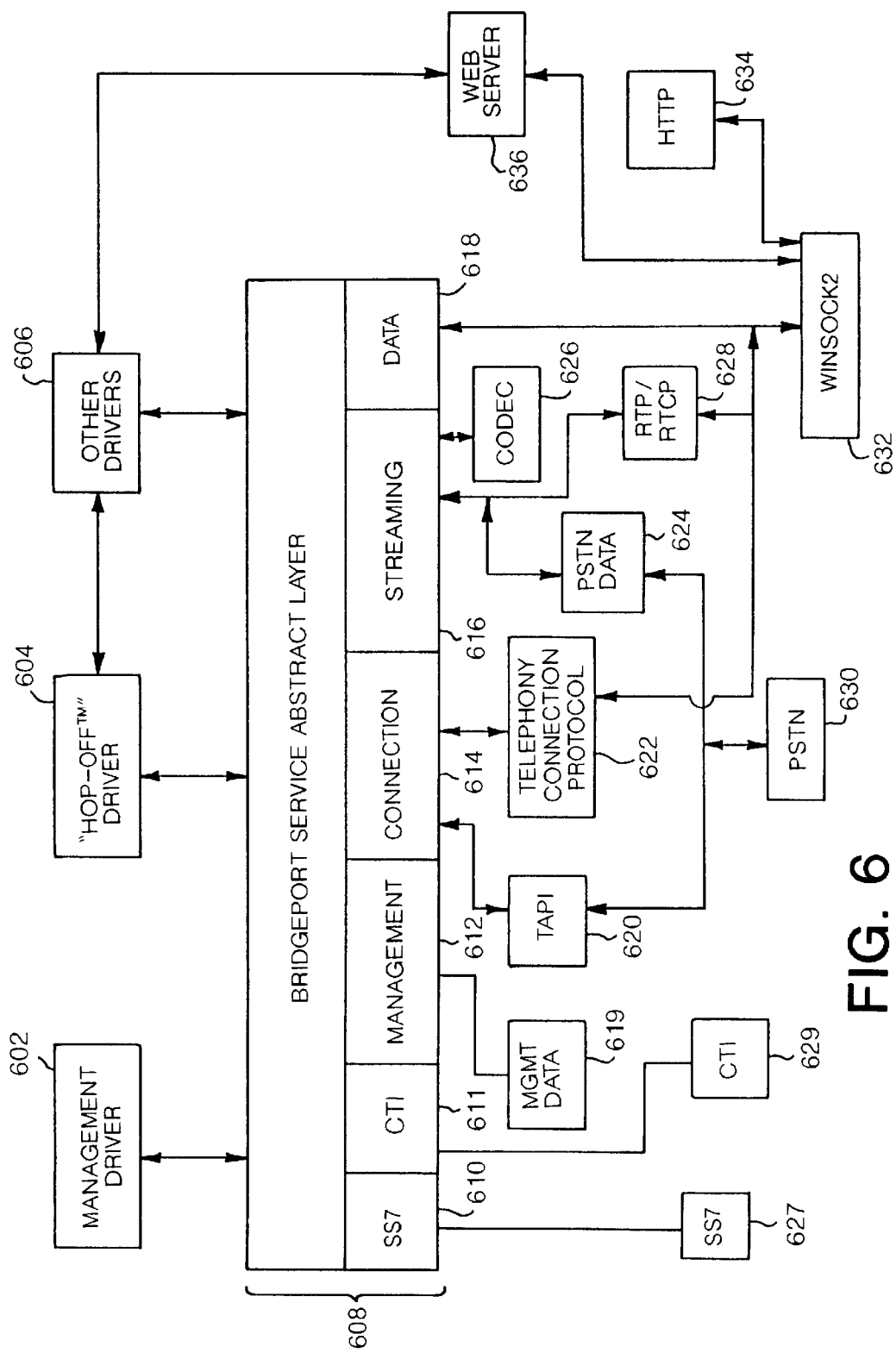

Turning now to FIGS. 5 and 6, two block diagrams illustrating the hardware and software elements of an exemplary computer server 500 suitable to be employed as a bridgeport are depicted. As illustrated, exemplary computer server 500 is comprised of multiple processors 502a–502n and memory subsystem 508 coupled to processor bus 504 as depicted. Additionally, computer server 500 is comprised of a second bus 510, a third bus 512 and a fourth bus 514. In one embodiment, buses 512 and 514 are Peripheral Component Interconnect (PCI) buses, while bus 510 is an Industry Standard Architecture (ISA) bus. PCI buses 512 and 514 are bridged by bus bridge 516, and bridged to ISA bus 510 and processor bus 504 by I/O controller 506. Coupled to PCI bus 512 are network interface 518 and display interface 520, which in turn is coupled to display 522. Coupled to PCI bus 514 is computer telephony interface (CTI) 524, PSTN interface 526 and SS7 Interface 528. Coupled to ISA bus 510 are hard disk interface 530, which in turn is coupled to a hard drive 532. Additionally, coupled to ISA bus 510. keyboard and cursor control device 534, which in turn is coupled keyboard 536 and cursor control device 538.

CTI interface 524 provides the necessary hardware to interface exemplary computer server 500 to telephony equipment, such as private branch exchange (PBX) equipment. PSTN interface 526 provides the necessary hardware to interface exemplary computer server 500 to a plurality of PSTN communication lines (e.g., T1, E1 or POTS), wherein the actual number of PSTN communication lines interfaced will be implementation dependent. Additionally, PSTN interface 526 provides advanced DSP-based voice, dual-tone multiple frequency (DTMF) and call progress functionality, which allows for downloadable DSP protocol and voice processing algorithms, thereby providing CODEC support locally on the interface. Examples of supported codecs include the Global System for Mobile Communications (GSM) codec and the ITU-T G.723.1 protocol codecs, the specification for which are commonly available from the GSM consortium and the International Telecommunications Union, respectively. Similarly, SS7 interface 528 provides the hardware necessary to interface exemplary computer server 500 with PSTN trunk lines (e.g., ISDN) supporting the out-of-band communication protocol (e.g., SS7)) used between PSTN network elements (i.e., SSP—SSP, SSP-STP, STP-SCP, etc.). In one embodiment, PSTN interface 526 is preferably an AG-T1™ (for U.S. implementations, while an AG-E1 may be seamlessly substituted for European implementations), while SS7 interface 528 is preferably the TX3000™, both of which, along with their accompanying software drivers, are manufactured by and commonly available from Natural MicroSystems of Natick, Mass. Otherwise, all other elements, processors 502\*, memory system 508 and so forth perform their conventional functions known in the art. Insofar as their constitutions are generally well known to those skilled in the art, they need not be further described.

From a software perspective, FIG. 6 illustrates the software elements of exemplary computer server 600. In particular, exemplary computer server 600 is shown comprising an application layer consisting of a Bridgeport Management Driver 602, Hop-off driver 602, and other drivers 606. Hop-off driver 604, supported by Management Driver 602, optional drivers 606, and abstracted service layer 608 implements the method steps of the above described exemplary "push-to-talk" application that are the responsibility of the community of bridgeports (i.e., bridgeports 162, and 165), including in particular, the method steps performed by call management service 102 of the present invention. In one embodiment, automated attendant service 104 is implemented as one the optional drivers 606. In one embodiment, automated attendant service 104 employs case based reasoning in providing customized call processing directions to call management service 102.

The Service Abstraction Layer (SAL) 608 is shown comprising SS7 services 610, CTI Services 611, Management Services 612, Connection Services 614, Streaming Services 616, and Data Services 618. The protocol/service layer is shown comprising Telephony Application Programming Interface (TAPI) 620, Telephony Connection Protocol 622, PSTN Data Interface 624, CODEC 626, Real Time (Streaming) Protocol 628, and HTTP server 634. Also shown in this "layer" are configuration management data 619 maintained by management service 612, and codec services 626 employed by streaming services 616. The driver layer is shown comprising SS7 driver 627, CTI driver 629, PSTN driver 630 and socket service 632. Data and control information are exchanged between these elements in the fashion depicted.

Within the context of the present invention, one purpose of SAL 608 is to provide an Application Programming Interface (API) for all the available bridgeport and related services in exemplary computer server 500. The API abstracts out the actual modules used for providing services such as connection establishment (614), streaming and data exchange services (616 and 618). Additionally, SAL 608 provides the common operation tools such as queue management, statistics management, state management and the necessary interface between the plug-in services (i.e., drivers in the driver layer). SAL 608 is also responsible for loading and unloading the appropriate drivers as appropriate.

Connection service 614 includes a connection establishment and tear-down mechanism facilitating the interconnection to the PSTN 440. Additionally, for the illustrated embodiment, connection service 614 employs connection and compatibility services which facilitate interoperation between communication equipment that support industry standards, thereby allowing a variety of communication equipment manufactured by different vendors to be benefited from the present invention. Connection services 614 include, in particular, services for supporting standard video telephony, such as ITU-T's H.323 video telephony, and standard data communication, such as ITU-T's T.120 data communication protocol. Examples of the connection establishment and tear-down mechanisms supported by connection service layer 614 include opening and starting PSTN ports, call control, DTMF collection, and tone generation, to name but a few.

Streaming service 616 is responsible for interfacing with the components that provide the real-time streaming functionality for the multimedia data. Once the connection has been established between the connection points (i.e., PSTN, H.323, etc.), streaming service 616 will take over the management and streaming of data between the two connected parties, until the connection is terminated. Codec service 626 facilitates the above described compression and transmission of inbound call signals from handset 442 as well as decompression and transmission of outbound call signals from client computer 402.

Data service 618 is responsible for providing non realtime peer to peer (i.e., computer—computer) messaging and data exchange between exemplary computer server 500 and other Internet and perhaps PSTN based applications. Sending messages to exemplary computer server end-points (i.e., other similarly equipped bridgeports on the Internet) or other servers within the PSTN is accomplished via data service 618.

CTI services 611 service all communications and automatic call distribution (ACD) necessary for Private Branch Exchange (PBX) based systems. SS7 services 610 service all out of band communications with STPs and/or SCPs of PSTN 440.

PSTN driver 630 is equipped to accommodate particularized PSTN interfaces 626, whereas CTI driver 629 is equipped to support particularized ACD and PBX equipment. Similarly, SS7 driver 627 is equipped to support particularized SS7 interface 628.

In the above description, reference is made to a "hop off" bridgeport, practicing the present invention, when establishing and facilitating a voice call to a PSTN extension on behalf of a client computer. Those skilled in the are will recognize that the present invention may also be practices in many other applications, including but not limited to call center applications, where increasing number of calls processed are originated from computer callers or callers having computers associated therewith.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. An apparatus comprising:
  (a) a storage medium having stored therein programming instructions that implement a set of communication services for bridging a voice call from a caller to a callee, wherein the communication services include call management services and an automated attendant service operatively coupled to each other,
    with the call management services equipped to transition the voice call through a first plurality of call states while connecting the caller to the callee, to notify the automated attendant services of call status events while transitioning the voice call, to receive call processing directions from the automated attendant services provided in response to the call status event notifications, and to provide information in non-audio form to the caller in accordance with the received call processing directions, and
    the automated attendant service equipped to receive the call status events from the call management services, and provide in response, the call processing directions, the caller being equipped to receive information in non-audio form, and (b) an execution unit coupled to the storage medium for executing the programming instructions.

2. The apparatus of claim 1, wherein the non-audio information includes web pages, and the call status events include at least one call status event selected from a call status event group that includes a web page pushed to caller event, and a web page browsed by caller event.

3. The apparatus of claim 1, wherein the call management services also facilitate selective provision of information in audio form to the caller.

4. The apparatus of claim 1, wherein the call status events include selected ones of a call arrival event, a call held event, a call still holding event, a placing call event, a call ringing event, a call still ringing event, a line busy event, and a call error event.

5. The apparatus of claim 1, wherein the non-audio information include web pages, and the call processing directions include a direction to push a web page to the caller.

6. The apparatus of claim 1, wherein the call processing directions include a direction to call a new destination instead.

7. The apparatus of claim 1, wherein the first plurality of call states include selected ones of a call registered state, a call setup state, a call holding state, a placing call state, a call busy state, a call ringing state, and a call error state.

8. The apparatus of claim 1, wherein the call management services transition the voice call from a call holding state into a placing call state, in response to a received call processing direction to proceed with the voice call calling a new destination instead.

9. The apparatus of claim 1, wherein the call management services automatically transition the voice call into a call holding state if a resource shortage condition is encountered for the apparatus.

10. The apparatus of claim 1, wherein the call management services automatically transition the voice call from a call holding state into a call ringing state if a resource becoming available condition is encountered for the apparatus.

11. The apparatus of claim 1, wherein the automated attendant service employs case based reasoning in providing the call processing directions.

12. The apparatus of claim 1, wherein the apparatus is coupled to a private branch exchange (PBX) to augment the PBX to provide call center services.

13. The apparatus of claim 1, wherein the automated attendant service provides the call processing directions customized in accordance with at least a characteristic of the voice call.

14. The apparatus of claim 1, wherein the call management services facilitate said selective provisioning of information in non-audio form to the caller targeting the non-audio information to a computer associated with the caller.

15. The apparatus of claim 1, wherein the call management services are further equipped to receive the voice call in packet form, the voice call in packet form being initiated by the caller using a computer, and the call management services facilitate said selective provisioning of information in non-audio form to the caller targeting the non-audio information to the same computer.

16. The apparatus of claim 15, wherein the call management services are further equipped to place a PSTN call to a PSTN extension of the callee on behalf of the caller, and bridge the packet based and PSTN calls.

17. A method comprising:

(a) transitioning by a collection of call management services a voice call through a first plurality of call states while connecting a caller to a callee of the voice call;

(b) notifying an automated attendant service, by the call management services, of call status events while transitioning the voice call;

(c) providing by the automated attendant service call processing directions responsive to the call status event notifications; and (d) facilitating provisioning of information in non-audio form to the caller in accordance with the call processing directions, the caller being equipped to receive non-audio information.

18. The method of claim 17, wherein said facilitating further includes facilitating provisioning of information in audio form to the caller in accordance with the call processing directions.

19. The method of claim 17, wherein said information in non-audio form includes web pages, and said call processing directions include a call processing direction to push an web page to the caller.

20. The method of claim 17, wherein said call processing directions include a direction to call a new destination instead.

21. The method of claim 17, wherein said transitioning comprises transitioning the voice call into selected ones of a call registered state, a call setup state, a call holding state, a placing call state, a call busy state, a call ringing state, and a call error state.

22. The apparatus of claim 17, wherein said transitioning comprises transitioning the voice call from a call holding state into a placing call state in response to a call processing direction to proceed with the voice call calling a new destination instead.

23. The method of claim 17, wherein said transitioning comprises transitioning the voice call into a call holding state if a resource shortage condition is encountered for a host apparatus.

24. The method of claim 17, wherein said transitioning comprises transitioning the voice call into a call ringing state if a resource becoming available condition is encountered for a host apparatus.

25. The method of claim 17, wherein said transitioning and facilitating are performed for a private branch exchange (PBX) to augment the PBX to provide call center services.

26. The method of claim 17, wherein the automated attendant service provides the call processing directions in accordance with at least a characteristic of the voice call.

27. The method of claim 17, wherein said selective provisioning of information in non-audio form to the caller being facilitated are provided to a computer associated with the caller.

28. The method of claim 17, wherein the method further comprises receiving the voice call in a packet based form, the packet based voice call being initiated by the caller using a computer, and said selective provisioning of information in non-audio form to the caller being facilitated are provided to the same computer.

29. The method of claim 28, wherein the method further comprises placing a PSTN call to a PSTN extension of the callee on behalf of the caller, and bridging the packet based and PSTN calls.

30. An article of manufacture comprising:

a recordable medium having recorded thereon a plurality of programming instructions for use to program an apparatus to equip the apparatus with a set of communication services to enable the apparatus to be able to bridge a voice call from a caller to a callee, the communication services including call management services and an automated attendant service, with the call management services enabling the apparatus to transition the voice call through a first plurality of call states while connecting the caller to the callee, to notify the automated attendant service of call status events while transitioning the voice call, to receive call processing direction provided in response from the automated attendant service, and to facilitate provisioning of information in non-audio form to the caller in accordance with the call processing direction, the caller being equipped to receive information in non-audio form, and the automated attendant service to receive the call status event notifications, and provide in response, the call processing directions.

31. The article of claim 30, wherein the call management services further enable the apparatus to be able to receive the voice call in packet form, the voice call in packet form being initiated by the caller using a computer, and to be able to facilitate said provisioning of information in non-audio form to the caller targeting the non-audio information to the same computer.

32. The article of claim 30, wherein the call management services further enable the apparatus to be able to place a PSTN call to a PSTN extension of the callee on behalf of the caller, and bridge the packet based and PSTN calls.

* * * * *